United States Patent [19]

Spencer et al.

[11] 4,043,968

[45] Aug. 23, 1977

[54] PROCESS FOR PRODUCING METHYLOLATED AMIDE COPOLYMERS IN CONCENTRATED ORGANIC SOLVENT SOLUTION

[75] Inventors: Arthur T. Spencer, New Providence; Stanley F. Siranovich, Highland Park, both of N.J.

[73] Assignee: Mobil Oil Corporation, New York, N.Y.

[21] Appl. No.: 653,687

[22] Filed: Jan. 30, 1976

[51] Int. Cl.² .................... C08F 8/00; C08F 22/38; C08K 5/05
[52] U.S. Cl. .................... 260/33.4 R; 260/32.8 N; 260/73 R; 526/71; 526/303; 526/304
[58] Field of Search .................... 260/33.4 R, 73 R; 526/71, 303, 304

[56] References Cited

U.S. PATENT DOCUMENTS

| | | | |
|---|---|---|---|
| 3,163,623 | 12/1964 | Sekmakas et al. | 260/33.4 R |
| 3,607,802 | 9/1971 | Sekmakas | 260/33.4 |

*Primary Examiner*—Harry Wong, Jr.
*Attorney, Agent, or Firm*—Charles A. Huggett

[57] ABSTRACT

Monoethylenically unsaturated monomers including an amide monomer are copolymerized in organic solvent solution to provide an amide copolymer solution, and volatile nitrogen-containing materials are removed from the solution without removing more than 15% of the solvent, based on the weight of the solution, and then the amide copolymer is reacted in the solution with formaldehyde in the presence of an acid catalyst, to methylolate the same.

10 Claims, No Drawings

PROCESS FOR PRODUCING METHYLOLATED AMIDE COPOLYMERS IN CONCENTRATED ORGANIC SOLVENT SOLUTION

The present invention relates to the solution copolymerization of monoethylenically unsaturated monomers, including an amide monomer, followed by the methylolation of the amide copolymer by reaction in organic solvent solution with formaldehyde in the presence of an acid catalyst. The organic solvent is usually alcoholic.

The reaction sequence described above is well known and commonly employed in the production of thermosetting organic solvent solution coating compositions in which the dissolved copolymer includes at least partially etherified N-methylol amide copolymer, usually based on acrylamide. However, and from the first efforts to produce thermosetting coatings in the described manner, the hazard of undue thickening or gelation during the methylolation reaction has troubled the art. Indeed, U.S. Pat. No. 3,037,963 points out that one should use more solvent (lower solids content) to avoid the tendency toward gelation which is especially difficult during the reaction with formaldehyde. When this is done, the patent indicates, a portion of the solvent can be evaporated after polymer formation has been completed in order to provide the desired high solids content. It is also common, after the methylolation reaction has been completed, to replace all or a portion of the butanol solvent which is normally used during the reaction by another solvent which provides more desirable characteristics when the coating solution is applied to a substrate and baked.

These prior art operations not only add expense to the manufacturing process, but the recovered butanol is contaminated, as with water and formaldehyde, so it cannot be easily recycled. Also, the resin product is usually more viscous than desired which limits the solid content which can be handled at the time of application.

It is stressed that the prior efforts have succeeded only in minimizing a difficult situation, for the tendency of the solution undergoing methylolation to unduly thicken and gel persists. Even when the gel is reversible, the power requirements for handling the excessively viscous or partially gelled systems are excessive. The cause of this thickening and gelation has not previously been known.

This invention is founded on the discovery of the presence of ammonium bicarbonate in the form of a solid condensate on the condenser tubes used for condensing the vapors which are removed from the reaction vessel as reflux distillation proceeds. The investigations which have been made as an incident to this invention lead us to conclude that a portion of the monoethylenically unsaturated amide component (the acrylamide) decomposes during polymerization to produce ammonia, and this ammonia is subjected to the methylolation reaction with formaldehyde.

When the methylolation reaction is carried out, the three hydrogen atoms in the ammonia are all reactive with formaldehyde to produce a tri-N-methylol derivative which could serve to cross-link the amide copolymer, especiallly during the first portion of the methylolation reaction, before extensive etherification (which involves removal of water) can occur. Indeed, the thickening and gelling problem is most critical at the beginning of the methylolation reaction, and the solids content can normally be increased considerably after the methylolation reaction is over.

The polymerization and methylolation reactions are carried out in sequence in a volatile organic solvent. These solvents normally include or consist of an alcohol, typically butanol, but other alcoholic solvents such as 2-ethoxy ethanol, 2-butoxy ethanol, and propanol are also useful. These may be used alone or in admixture or in combination with other solvents such as toluene or methyl ethyl ketone, or the like.

In accordance with this invention, we remove the volatile nitrogen-containing materials from the reaction mixture after polymerization is substantially completed and before the methylolation reaction has been allowed to progress to any significant extent. Normally, this is done either at the end of the polymerization reaction or just before the addition of the formaldehyde reactant.

The removal of the volatile nitrogen-containing material can be achieved in various ways, and it is appropriate to consider the alternatives separately.

One way to remove the volatile nitrogen-containing materials is to strip away by distillation some of the butanol solvent before formaldehyde is added (or before the catalyst is added). The removed butanol carries with it the offending nitrogenous materials. This concentrates the reaction solution which is the opposite of the dilution normally used. Surprisingly, by concentrating the solution prior to reaction with formaldehyde, the peak viscosity during the methylolation reaction is lowered, and this is true regardless of whether the butanol is replaced or not. On the other hand, removal of solvent is not a very practical way to proceed, for it disrupts the process and leads to large amounts of solvent which are not easily recycled, and this is economically disadvantageous.

In accordance with this invention, the nitrogenous material is removed without removing large amounts of solvent. One way to do this is by raising the temperature in the reflux condenser. Normally, the condenser temperature is about 20°-35° C. as a result of using available water as the coolant. However, one can adjust coolant flow or use hot water or even steam to provide a higher condenser temperature and thereby condense and return the solvent without condensing the volatile nitrogenous material. This can be done by maintaining a temperature at the head of the condenser of at least about 35°-40° C., but sufficient to condense the solvents. The temperature at the head of the condenser will usually be set in the range of 60°-120° C. in this invention. Normally, and using water to condense all the volatiles, the head temperature is about the same as the water, e.g., about 25° C.

Still another way to proceed is to turn off the condenser and blow an inert gas, such as nitrogen, or carbon dioxide, through the hot amide-copolymer solution maintained at a temperature below reflux temperature. This again removes the offending volatile nitrogenous materials, while little solvent is removed, and the vapors are not condensed and returned.

It has been found that the removal in the manner described of nitrogen-containing materials corresponding to at least 0.5% of the weight of the amide monomer used (the amide monomer is used in an amount of from 4–25%, preferably from 6–15%, based on total monomer) is effective to lower the peak viscosity encountered during methylolation. At least 1% on the same basis is preferably removed, and in actual operation using 10–12% of acrylamide, based on the weight of total monomers, an amount of nitrogen is removed which calculates to from 3-5 parts of acrylamide per 100 parts of acrylamide supplied.

The volatile nitrogen-containing materials which are removed must come from the breakdown of the amide monomer. This is so because the amide monomer is the only nitrogen-containing material present in the system.

It is important that large amounts of organic solvent not be removed from the system for the reasons indicated previously. On the other hand, the inadvertent elimination from the reaction system of small amounts of solvent can be tolerated, but solvent removal should not exceed 15% of the weight of the copolymer solution, and preferably should not exceed 5%.

As is evident from the previous discussion, it is desired to proceed with the copolymerization, and then with the subsequent methylolation reaction at high solids content. This denotes at least 40% nonvolatile solids content in the solution throughout the process. In prior practice, it was usual to add solvent prior to reaction with formaldehyde so that the solids content was below 40% during methylolation. Then, after methylolation had been completed, the excess solvent was removed to increase the solids content of the system to the level desired in use (normally about 50% or higher). The removed solvent is not well suited for recycling. In the preferred practice of this invention, the solids content is maintained at a level of at least 50% throughout the process and most preferably at a solids content in the range of 50-60%.

The monomers which are copolymerized are usually a blend of nonreactive monoethylenic monomers and reactive monoethylenic monomers.

The bulk of the copolymer (at least 50%, and preferably at least 60% by weight) is constituted by nonreactive monoethylenic monomers, such as styrene, vinyl toluene, methyl methacrylate, ethyl acrylate, butyl or isobutyl acrylates or methacrylates, acrylonitrile, vinyl acetate, and similar monomers. However, small amounts of polyethylenically unsaturated materials (such as unsaturated polyesters) can be present, so long as organic solvent solubility is maintained in the copolymer.

As can be seen from the above, the following types of nonreactive monomers are useful, namely, vinyl aromatic hydrocarbons, acrylic-type esters, vinyl esters and monoethylenic nitriles.

The essential reactive monomer is a monoethylenically unsaturated amide which is usually acrylamide. However, other monoethylenically unsaturated carboxylic acid amides are known and are broadly useful herein, these being illustrated by methacrylamide.

Other reactive monomers may also be present, especially monoethylenically unsaturated carboxylic acids, such as acrylic acid, methacrylic acid, crotonic acid, or itaconic acid. These are usually used in an amount of at least 0.5%, based on total monomers, but where water dispersibility with the aid of a base is contemplated, then larger amounts of unsaturated acid, e.g., from 3-12%, are desirably present.

In addition to the carboxyl functional monomer, it is also permissible, and in some cases desirable, to include an hydroxy functional material illustrated by 2-hydroxyethyl acrylate, or the like.

Other reactive materials are generally excluded, but small amounts thereof which do not cause premature gelation can be tolerated. These would be illustrated by amine-functional monomers, such as dimethyl aminoethyl methacrylate.

The solution copolymerization is itself wholly conventional. The usual solvents are a mixture of aromatic hydrocarbons, such as toluene or xylene, and alcohols, such as butanol, 2-ethoxy ethanol, or 2-butoxy ethanol. The term "alcohol" is used in its normal connotation in which it identifies a monohydric alcohol, and the preferred solvent systems include an alcohol which provides an alcoholic medium for the subsequent methylolation reaction.

To complete the discussion of the conventional copolymerization, the solvent solution is normally heated to polymerization temperature (usually 75°-150° C.) and a free radical polymerization catalyst, such as benzoyl peroxide, t-butyl perbenzoate, or the like, is present. Mercaptans may also be present to control molecular weight.

The subsequent methylolation reaction is also conventional, the reaction being carried out using formaldehyde (which may be added as a solution in alcohol or as paraformaldehyde), and an acid catalyst is employed. If there is sufficient acid in the copolymer, then no additional acid need be added. Usually, a small proportion of acid catalyst, such as maleic acid, is added.

As the reaction proceeds, water is removed, this being water of etherification created by the etherification reaction between the alcoholic solvent and the methylol groups which are produced by the adduction reaction between the formaldehyde and the amido hydrogen atoms in the copolymer.

The invention is illustrated in the examples which follow.

EXAMPLE 1

A base polymer solution was prepared at 55% solids by charging a 5 liter reaction flask with 568g of butanol. After heating to reflux, using a total condenser, a mixture of 191g acrylamide, 507g ethyl acrylate, 836g styrene, 203g methacrylic acid, 37.1g t-butyl perbenzoate and 852g butanol was added over a four-hour period under inert gas atmosphere. The polymer solution was held at reflux for one additional hour.

The polymerization was completed by adding 8.3g more t-butyl perbenzoate and holding at reflux for an additional two hours. During this time steam was passed through the condenser jacket converting it to a partial condenser through which volatile impurities were stripped from the reaction while the butanol solvent was returned. Temperature at the distilling head of the condenser rose from 81° to 114° C. during the stripping operation. The stripped materials were collected and analyzed. They were found to contain nitrogen equivalent to 3% of the acrylamide originally present.

Functionalization of the base polymer was carried out by adding 402g of a 40% solution of formaldehyde in butanol and refluxing through a decanter for three hours to remove the water of reaction. During the functionalization, the reaction mixture remained constant in viscosity. The final solids were 56%. The product was a clear yellow solution of Gardner-Holt viscosity $Z_4-$ when cut five parts resin solution to one part 2-ethoxy ethanol acetate.

EXAMPLE 2

Example 1 was repeated except the polymerization was completed under conditions of total reflux without any attempt to remove volatile impurities. This provided a base polymer solution at 55% solids.

Functionalization was carried out as in Example 1 by adding 402g of a 40% formaldehyde solution in butanol and refluxing through a decanter. During this functionalization reaction the reaction mixture increased in viscosity and gelled in 75 minutes.

EXAMPLE 3

The base polymer solution of Example 2 was prepared again at 55% solids. After completion of the polymerization, butanol and other volatile reaction products were stripped from the reaction mixture to increase the resin solids content to 60%. Functionalization of the reaction mixture, carried out as in Examples 1 and 2 was successful in spite of the increased reaction solids. Final resin solids were 62%.

EXAMPLE 4

The base polymer solution of Example 1 was prepared at 60% resin solids in butanol. During the last two hours of polymerization the butanol was refluxed into a steam heated partial condenser that allowed the more volatile nitrogen-containing byproducts to pass. Functionalization with formaldehyde was carried out as in Example 1. The viscosity of the reaction mixture remained constant during functionalization. The product was a clear yellow solution of 64% solids with a viscosity of $Z_5+$ when cut as in Example 1.

EXAMPLE 5

The base polymer solution of Example 2 was prepared again at 55% resin solids. This polymer solution was then maintained at a temperature below that of reflux and sparged with inert gas for one hour to remove volatile nitrogen-containing impurities. Functionalization of the reaction mixture with formaldehyde as in Example 1 resulted in a continuous decrease in viscosity as the reaction proceeded.

EXAMPLE 6

The base polymer solution of Example 2 was prepared again at 55% solids. After holding the initial polymer solution at total reflux for one hour, additional initiator was added and the condenser was set to return refluxate to the reactor through a mixed bed ion exchange resin for the two hours required to complete polymerization in order to remove volatile nitrogen-containing ionic byproducts. Functionalization with formaldehyde, as in Example 1, resulted in a continuous drop in viscosity as the reaction proceeded.

The invention is defined in the claims which follow. We claim:

1. A process for the production of methylolated amide copolymers in concentrated alcoholic organic solvent solution comprising, copolymerizing polymerizable monomers consisting essentially of monoethylenically unsaturated monomers, at least 50% of which are monoethylenically unsaturated monomers selected from vinyl aromatic hydrocarbons, acrylic-type esters, vinyl esters and monoethylenic nitriles, and including from 4–25% of an amide monomer selected from acrylamide or methacrylamide, in alcoholic organic solvent solution to provide an amide copolymer solution, removing volatile nitrogen-containing decomposition products of the amide monomer in an amount corresponding to at least 0.5% by weight of the amide monomer used without removing more than 15% of solvent, based on the weight of the solution, and then reacting the amide copolymer in said solution with formaldehyde in the presence of an acid catalyst.

2. A process as recited in claim 1 in which the amide monomer is acrylamide, and is used in an amount of from 6–15%, based on the weight of total monomer.

3. A process as recited in claim 1 in which the solids content of the system is maintained at a level of at least 40% by weight throughout the process.

4. A process as recited in claim 3 in which the solids content is maintained at a level of at least 50% by weight throughout the process.

5. A process as recited in claim 1 in which volatile nitrogen-containing materials are removed in an amount corresponding to at least 1% by weight of the amide monomer used.

6. A process as recited in claim 1 in which volatile nitrogen-containing materials are removed by refluxing the amide copolymer solution while maintaining a temperature at the head of the condenser of at least about 35°–40° C. to condense the solvents employed in the solution without condensing the nitrogen-containing materials.

7. A process as recited in claim 6 in which the temperature at the head of the condenser is in the range of 60°–120° C.

8. A process as recited in claim 1 in which the volatile nitrogen-containing materials are removed by blowing an inert gas through the hot amide copolymer solution maintained at a temperature below reflux temperature, the vapors which are removed not being condensed and returned.

9. A process as recited in claim 1 in which the vinyl aromatic hydrocarbon is styrene or vinyl toluene, the acrylic-type ester is methyl methacrylate, ethyl acrylate, butyl acrylate, isobutyl acrylate, or methacrylates corresponding to the aforesaid acrylates, the monoethylenic nitrile is acrylonitrile, and the vinyl ester is vinyl acetate.

10. A process as recited in claim 9 in which said alcoholic organic solvent is constituted by a mixture of aromatic hydrocarbon and an alcohol selected from the group consisting of butanol, 2-ethoxy ethanol and 2-butoxy ethanol.

* * * * *